(12) United States Patent
Yamamoto

(10) Patent No.: US 9,647,505 B2
(45) Date of Patent: May 9, 2017

(54) ROTATING ELECTRICAL MACHINE

(71) Applicant: Naoki Yamamoto, Tokyo (JP)

(72) Inventor: Naoki Yamamoto, Tokyo (JP)

(73) Assignee: MITSUBISHI ELECTRIC CORPORATION, Chiyoda-Ku, Tokyo (JP)

(*) Notice: Subject to any disclaimer, the term of this patent is extended or adjusted under 35 U.S.C. 154(b) by 193 days.

(21) Appl. No.: 14/426,894

(22) PCT Filed: Dec. 19, 2012

(86) PCT No.: PCT/JP2012/082892
§ 371 (c)(1),
(2) Date: Mar. 9, 2015

(87) PCT Pub. No.: WO2014/097416
PCT Pub. Date: Jun. 26, 2014

(65) Prior Publication Data
US 2015/0249374 A1     Sep. 3, 2015

(51) Int. Cl.
*H02K 9/02* (2006.01)
*H02K 3/487* (2006.01)
(Continued)

(52) U.S. Cl.
CPC ........... *H02K 3/487* (2013.01); *H02K 3/24* (2013.01); *H02K 9/02* (2013.01); *H02K 9/10* (2013.01); *H02K 2213/03* (2013.01)

(58) Field of Classification Search
CPC ............. H02K 3/24; H02K 3/487; H02K 9/02
See application file for complete search history.

(56) References Cited

U.S. PATENT DOCUMENTS 2,986,664 A * 5/1961 Willyoung ............... H02K 3/24
310/61
3,995,180 A * 11/1976 Giles ...................... H02K 9/005
310/55
(Continued)

FOREIGN PATENT DOCUMENTS

EP    2 031 733 A2    3/2009
EP    2 180 578 A2    4/2010
(Continued)

OTHER PUBLICATIONS

International Search Report (PCT/ISA/210) mailed on Mar. 19, 2013, by the Japanese Patent Office as the International Searching Authority for International Application No. PCT/JP2012/082892.
(Continued)

*Primary Examiner* — Dang Le
(74) *Attorney, Agent, or Firm* — Buchanan Ingersoll & Rooney PC

(57) ABSTRACT

A rotating electrical machine is configured such that, in a rotor coil, ventilation passages are formed in two lines arranged in a width direction of the rotor coil, and formed in the same shape at a plurality of positions spaced from each other in a longitudinal direction, $0.3 \leq W1/W2 \leq 0.7$ . . . (Expression 1) is satisfied, where (W1) is a width dimension of the ventilation passage in the longitudinal direction and (W2) is a width dimension from one end of the ventilation passage to one end of another ventilation passage adjacent thereto, and $0.025 \leq W4/W3 \leq 0.08$ . . . (Expression 2) is satisfied, where (W3) is a width dimension of the rotor coil and (W4) is a width dimension of the ventilation passage.

7 Claims, 3 Drawing Sheets

(51) Int. Cl.
*H02K 3/24* (2006.01)
*H02K 9/10* (2006.01)

(56) References Cited

U.S. PATENT DOCUMENTS

| | | | |
|---|---|---|---|
| 6,288,461 B1 * | 9/2001 | Mori | ........................ H02K 3/24 310/58 |
| 6,459,180 B1 * | 10/2002 | Mori | .................. H02K 15/0414 174/15.6 |
| 2009/0058205 A1 | 3/2009 | Tounosu et al. | |
| 2010/0096937 A1 | 4/2010 | Kaminski et al. | |

FOREIGN PATENT DOCUMENTS

| | | |
|---|---|---|
| EP | 2 031 733 A3 | 12/2011 |
| JP | 7-213000 A | 8/1995 |
| JP | 9-285052 A | 10/1997 |
| JP | 2000-139050 A | 5/2000 |

OTHER PUBLICATIONS

Office Action (Notice of Reasons for Rejection) issued on Sep. 1, 2015, by the Japanese Patent Office in corresponding Japanese Patent Application No. 2014-552808, and an English Translation of the Office Action. (8 pages).

Extended European Search Report dated Sep. 15, 2016, issued by the European Patent Office in corresponding European Application No. 12890413.3. (9 pages).

* cited by examiner

VENTILATION PASSAGE WIDTH DIMENSION: W4
/ ROTOR COIL WIDTH DIMENSION: W3
$\eta = W1/W2$

ROTATING ELECTRICAL MACHINE

TECHNICAL FIELD

The present invention relates to a rotating electrical machine capable of sufficiently exerting a cooling effect.

BACKGROUND ART

A conventional rotating electrical machine has rotor windings accommodated in a plurality of slots provided in a rotor iron core, each rotor winding having winding conductors obtained by stacking plate-like conductors at plural stages via insulating materials, and a plurality of through-holes formed in the plurality of conductors and the plurality of insulating materials, to form a plurality of ventilation passages through which cooling gas flows in a radial direction of the rotor iron core and flows in an axial direction of the rotor iron core. The plurality of through-holes are formed in plural lines arranged in a width direction of the conductors. In the case where the width dimension of the conductors is denoted by WC, and a sum of width dimensions, in the width direction of the conductors, of the through-holes or the ventilation passages formed in the plural lines is denoted by WH, a ventilation area of the through-holes or the ventilation passages formed in the plural lines is set so as to satisfy a relationship of $0.2 \leq WH/WC \leq 0.7$ (for example, see Patent Document 1).

CITATION LIST

Patent Document

Patent Document 1: Japanese Laid-Open Patent Publication No. 2000-139050

SUMMARY OF THE INVENTION

Problems to be Solved by the Invention

The conventional rotating electrical machine is configured to satisfy $0.2 \leq WH/WC \leq 0.7$ in the case where the width dimension of the conductors is denoted by WC, and a sum of width dimensions, in the width direction of the conductors, of the through-holes or the ventilation passages formed in the plural lines is denoted by WH. Therefore, for example, if the through-holes are formed in two lines, it is considered that each of the through-holes is formed to satisfy $0.1 \leq WH/WC \leq 0.35$. However, there is a problem that, even if the rotating electrical machine is configured to satisfy such a condition, a cooling effect is not sufficiently exerted.

The present invention has been made to solve the above problem and an object of the present invention is to provide a rotating electrical machine capable of sufficiently exerting a cooling effect.

Solution to the Problems

A rotating electrical machine of the present invention is configured as follows.

The rotor includes: a plurality of coil slots formed in an axial direction on an outer circumferential surface of the rotor, the coil slots spaced from each other in a circumferential direction of the rotor; a sub slot formed at a bottom portion of each coil slot, the sub slot opening in the axial direction of the rotor; a winding conductor formed to be accommodated above each sub slot in each coil slot; and a wedge formed to fix each winding conductor in the coil slot, the wedge having a hole formed in a radial direction of the rotor.

Each winding conductor has ventilation passages formed in two lines arranged in a width direction of the winding conductor, the ventilation passages penetrating the winding conductor in the radial direction of the rotor so as to allow cooling gas to flow from the sub slot toward the wedge.

Sets of the two lines of ventilation passages are formed in the same shape at a plurality of positions spaced from each other in a longitudinal direction of each winding conductor.

The following expression is satisfied, $$0.3 \leq W1/W2 \leq 0.7 \qquad \text{(Expression 1)}$$

where W1 is a width dimension of each ventilation passage in the longitudinal direction of each winding conductor, and W2 is a width dimension from one end of each ventilation passage to one end of another ventilation passage adjacent thereto in the longitudinal direction of the winding conductor.

The following expression is satisfied, $$0.025 \leq W4/W3 \leq 0.08 \qquad \text{(Expression 2)}$$

where W3 is a width dimension of each winding conductor and W4 is a width dimension of each single ventilation passage.

Effect of the Invention

Owing to the above configuration, the rotating electrical machine of the present invention can efficiently exert a cooling effect.

DESCRIPTION OF EMBODIMENTS

Embodiment 1

Figure 1:
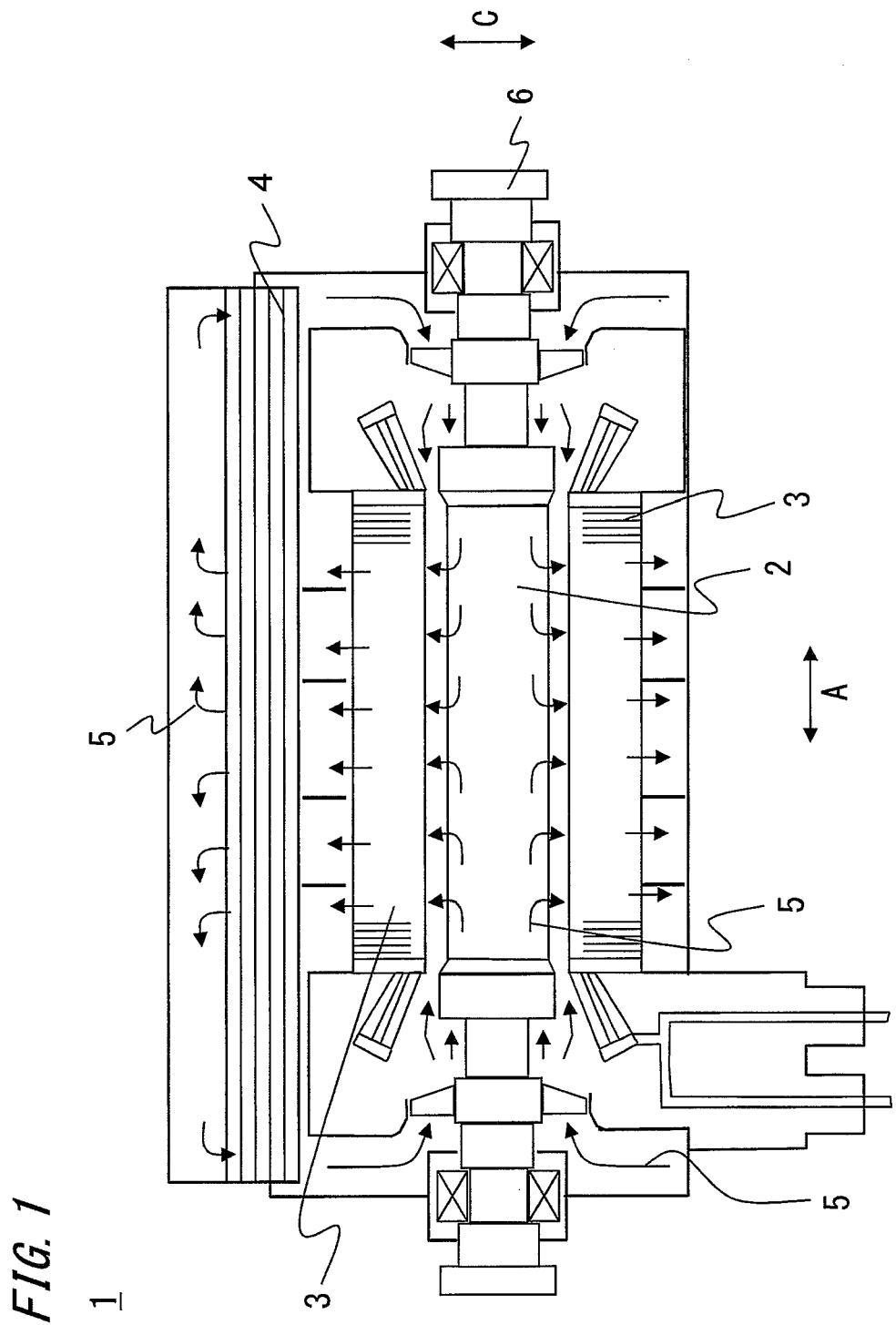
FIG. 1 is a diagram showing the structure of a rotating electrical machine of embodiment 1 of the present invention.
Figure 2:
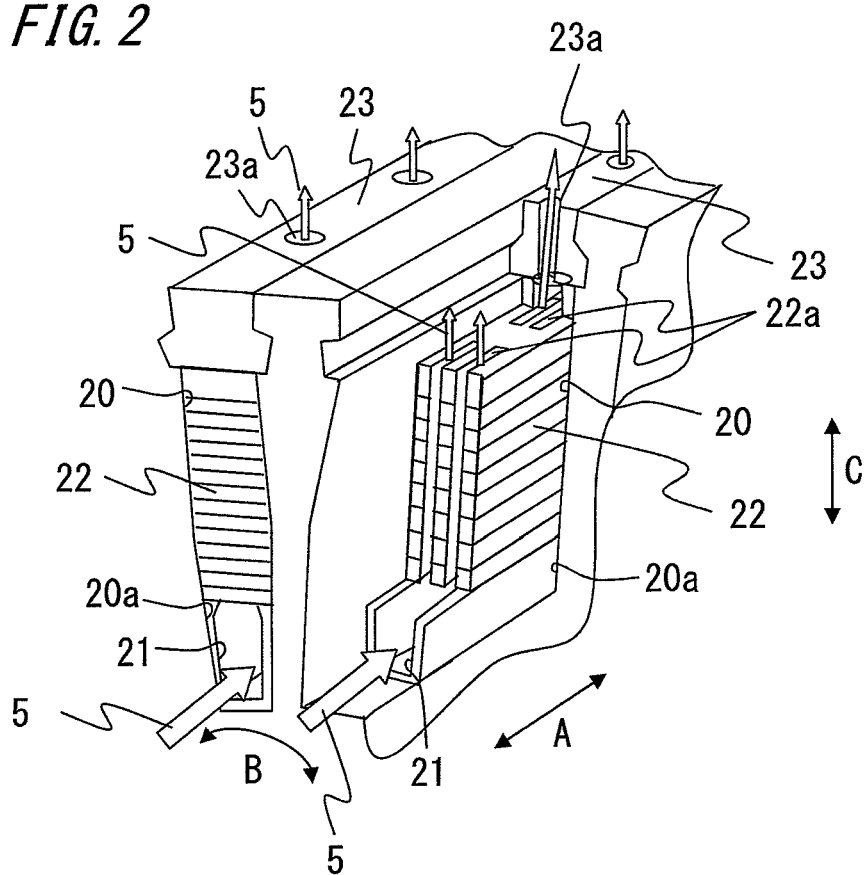
FIG. 2 is a partial enlarged view of the rotating electrical machine shown in FIG. 1.
Figure 3:
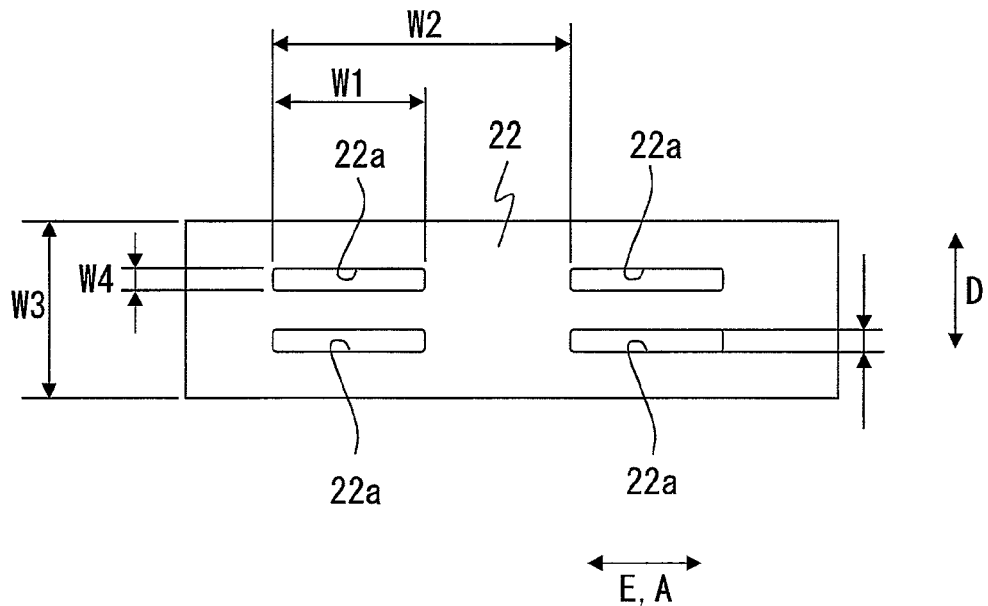
FIG. 3 is a partial enlarged view of a rotor coil of the rotating electrical machine shown in FIG. 2.
Figure 4:
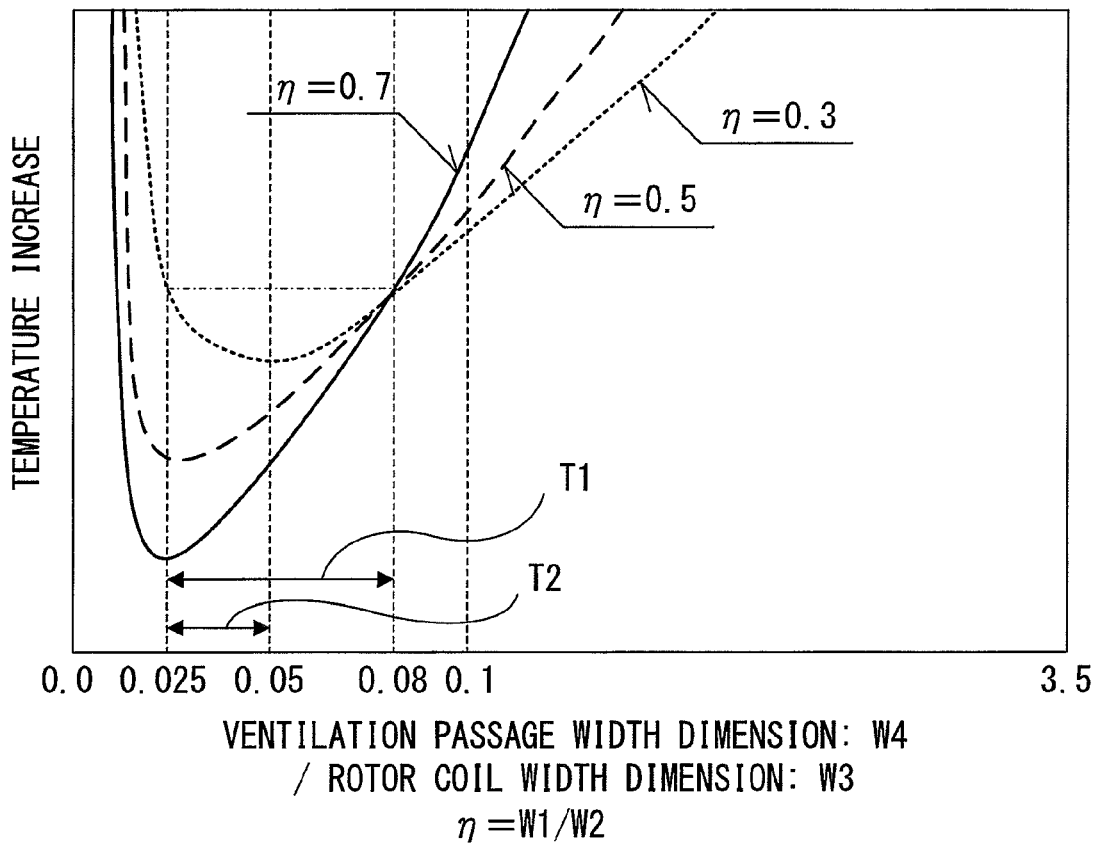
FIG. 4 is a diagram for explaining a characteristic of the rotating electrical machine shown in FIG. 1.

Hereinafter, an embodiment of the present invention will be described. FIG. 1 is a sectional view showing the structure of a rotating electrical machine of embodiment 1 of the present invention. FIG. 2 is a partial enlarged perspective view showing the details of a rotor of the rotating electrical machine shown in FIG. 1. FIG. 3 is a partial top view showing the details of a coil of the rotor of the rotating electrical machine shown in FIG. 2. FIG. 4 is a graph showing a relationship between "width dimension W4 of ventilation passage 22a/width dimension W3 of rotor coil 22" and temperature increase in the rotating electrical machine shown in FIG. 1.

In the figures, the rotating electrical machine 1 includes a rotor 2, a stator 3, a cooler 4, and a rotational shaft 6. The stator 3 has a cylindrical shape and is disposed around the outer circumference of the rotor 2. The rotor 2 is rotated by rotation of the rotational shaft 6. The cooler 4 cools cooling gas 5 that has cooled the rotating electrical machine 1, and returns the cooling gas 5 into the rotating electrical machine 1. The rotor 2 includes a coil slot 20, a sub slot 21, a rotor coil 22 as a winding conductor, and a wedge 23. The coil slot 20 is formed in an axial direction A on an outer circumferential surface of the rotor 2. A plurality of the coil slots 20 are formed being spaced from each other in a circumferential direction B of the rotor 2.

The sub slot 21 is formed at a bottom portion 20a of each coil slot 20 and is formed to open in the axial direction A of the rotor 2. The rotor coil 22 is formed to be accommodated above each sub slot 21 in each coil slot 20. The wedge 23 is formed to fix and hold, in each coil slot 20, each rotor coil 22 which is subjected to a centrifugal force. The wedge 23 has a hole 23a in a radial direction C of the rotor 2.

In each rotor coil 22, a plurality of ventilation passages 22a are formed. The ventilation passages 22a are formed to penetrate through the rotor coil 22 in the radial direction C of the rotor 2 so that the cooling gas 5 flows from the sub slot 21 toward the wedge 23. The cooling gas 5 passes through the sub slot 21 to flow in the axial direction, while passing through the ventilation passages 22a provided in the radial direction of the rotor coil 22 and then flowing through the hole 23a of the wedge 23. Thus, the cooling gas 5 cools the rotor 2.

The ventilation passages 22a are formed in two lines arranged in a width direction D of the rotor coil 22. Sets of the two lines of the ventilation passages 22a are formed in the same shape at a plurality of positions spaced from each other in a longitudinal direction E of the rotor coil 22 (the longitudinal direction E is the same direction as the axial direction A of the rotor 2). The width dimension of the ventilation passage 22a in the longitudinal direction E of the rotor coil 22 is denoted by W1. The width dimension from one end of the ventilation passage 22a to one end of another ventilation passage 22a adjacent thereto in the longitudinal direction E of the rotor coil 22 is denoted by W2. The following relationship is satisfied.

$$0.3 \leq W1/W2 \leq 0.7 \quad \text{(Expression 1)}$$

The width dimension of the rotor coil 22 is denoted by W3.

The width dimension of one ventilation passage 22a is denoted by W4.

The following relationship is satisfied.

$$0.025 \leq W4/W3 \leq 0.08 \quad \text{(Expression 2)}$$

Optimally, the following relationship is satisfied.

$$0.025 \leq W4/W3 \leq 0.05 \quad \text{(Expression 3)}$$

The present invention provides an optimal rotating electrical machine 1 with increased cooling performance by forming the ventilation passage 22a of the rotor coil 22 in an optimal shape. A ground for formation of the ventilation passage 22a of the rotating electrical machine 1 of embodiment 1 configured as described above will be described. In the rotor coil 22 having the ventilation passages 22a arranged in two lines in the width direction D of the rotor coil 22 as shown above, the shapes of the ventilation passages 22a greatly influence the temperature of the rotor coil 22.

Creation of a rotor temperature analysis model has enabled accurate calculation of the temperature of a rotor coil. FIG. 4 shows a result of temperature comparison using a temperature analysis model for the rotor 2, based on shapes in the case where two lines of ventilation passages 22a are provided. In FIG. 4, the horizontal axis indicates the ratio of the width dimension W4 of the ventilation passage 22a to the width dimension W3 of the rotor coil 22, and the vertical axis indicates temperature increase in the rotor coil 22, whereby the relationship therebetween is shown. The shown result is a result obtained under the conditions that the relationship between the width dimension W1 of the ventilation passage 22a and the width dimension W2 from the ventilation passage 22a to one end of another ventilation passage 22a adjacent thereto, that is, the value of W1/W2=η is 0.3, 0.5, 0.7. The reason for using the above values of n is because a general width dimension W3 of the ventilation passage 22a is often set in a range of η=0.3 to 0.7.

From the results under the above conditions, it is found that, whichever the set value of η is, a condition having a high cooling effect is that the value of W4/W3 is in a range T1 from 0.025 to 0.08, that is, from a value (0.025) at which temperature increase in the case of η=0.7 is minimized to a value (0.08) at an intersection of temperature increase lines in the case of η=0.3 to 0.7. Further, it is found that an optimal condition is a range from the value (0.025) at which temperature increase in the case of η=0.7 is minimized to a value (0.05) at which temperature increase in the case of η=0.3 is minimized, that is, an optimal condition for a cooling effect is that the value of W4/W3 is in a range T2 from 0.025 to 0.05.

According to the rotating electrical machine of embodiment 1 configured as described above, ventilation passages are formed in shapes exerting an excellent cooling effect, whereby the rotating electrical machine can be cooled efficiently. In addition, the efficient cooling allows increase in field current applied to a rotor coil, whereby output of the rotating electrical machine can be increased.

The present invention does not depend on the structure of the cooler, the type of the cooling gas, or the like. Therefore, even if the cooler 4 is not provided, the present invention can be applied in the same manner and thereby can provide the same effect. In addition, the cooling gas 5 may be either air or gas as a refrigerant other than air, and even in this case, the present invention can be applied in the same manner and thereby can provide the same effect.

It is noted that, within the scope of the present invention, the above embodiment may be modified or abbreviated as appropriate.

The invention claimed is:

1. A rotating electrical machine comprising:
    a rotor; and
    a stator disposed around an outer circumference of the rotor, wherein
    the rotor includes:
        a plurality of coil slots formed in an axial direction on an outer circumferential surface of the rotor, the coil slots spaced from each other in a circumferential direction of the rotor;
        a sub slot formed at a bottom portion of each coil slot, the sub slot opening in the axial direction of the rotor;
        a winding conductor stacked in a plurality of stages above each sub slot in each coil slot; and
        a wedge formed to fix each winding conductor stacked in the plurality of stages in the coil slot, the wedge having a hole formed in a radial direction of the rotor,
    each winding conductor stacked in the plurality of stages has ventilation passages formed in two lines arranged in a width direction of the winding conductor, with a long side of each ventilation passage directed in a longitudinal direction of the winding conductor, the ventilation passages penetrating the winding conductor so as to allow cooling gas to flow from the sub slot toward the wedge, sets of the two lines of ventilation passages are formed in the same shape at a plurality of positions spaced from each other in the longitudinal direction of each winding conductor, the following expression is satisfied, $$0.3 \leq W1/W2 \leq 0.7 \quad \text{(Expression 1)}$$

where W1 is a width dimension of each ventilation passage in the longitudinal direction, and W2 is a width dimension from one end of each ventilation passage to one end of another ventilation passage adjacent thereto in the longitudinal direction of the winding conductor, and the following expression is satisfied, $$0.025 \leq W4/W3 \leq 0.08 \quad \text{(Expression 2)}$$

where W3 is a width dimension of each winding conductor and W4 is a width dimension of each single ventilation passage.

2. The rotating electrical machine according to claim 1, wherein the following expression is satisfied, $$0.025 \leq W4/W3 \leq 0.05 \quad \text{(Expression 3)}.$$

3. A rotating electrical machine comprising:
a rotor; and
a stator disposed around an outer circumference of the rotor, wherein
the rotor includes:
  a plurality of coil slots formed in an axial direction on an outer circumferential surface of the rotor, the coil slots spaced from each other in a circumferential direction of the rotor;
  a sub slot formed at a bottom portion of each coil slot, the sub slot opening in the axial direction of the rotor;
  a winding conductor stacked in a plurality of stages above each sub slot in each coil slot; and
  a wedge formed to fix, in the coil slot, each winding conductor stacked in the plurality of stages, the wedge having a hole formed in a radial direction of the rotor, each winding conductor stacked in the plurality of stages has ventilation passages formed in two lines arranged in a width direction of the winding conductor, with a long side of each ventilation passage directed in a longitudinal direction of the winding conductor, the ventilation passages penetrating the winding conductor so as to allow cooling gas to flow from the sub slot toward the wedge, sets of the two lines of ventilation passages are formed in the same shape at a plurality of positions spaced from each other in the longitudinal direction of each winding conductor, and on a condition of the following expression, $$0.3 \leq W1/W2 \leq 0.7 \quad \text{(Expression 1)}$$

where W1 is a width dimension of each ventilation passage in the longitudinal direction, and W2 is a width dimension from one end of each ventilation passage to one end of another ventilation passage adjacent thereto in the longitudinal direction of the winding conductor, each ventilation passage is formed such that a value of W4/W3 is in a range from a value at which temperature increase in the case of $\eta=W1/W2=0.7$ becomes a minimum value, to a value at an intersection of temperature increases in the case of $\eta=W1/W2=0.3$ to 0.7, where W3 is a width dimension of each winding conductor and W4 is a width dimension of each single ventilation passage.

4. The rotating electrical machine according to claim 1, wherein the sub slot is a U-shaped sleeve which contacts three surfaces of a respective one of the coil slots.

5. The rotating electrical machine according to claim 4, wherein the winding conductor is supported on edges of the U-shaped sleeve.

6. The rotating electrical machine according to claim 3, wherein the sub slot is a U-shaped sleeve which contacts three surfaces of a respective one of the coil slots.

7. The rotating electrical machine according to claim 6, wherein the winding conductor is supported on edges of the U-shaped sleeve.

* * * * *